United States Patent [19]
Sowell et al.

[11] Patent Number: 5,722,111
[45] Date of Patent: Mar. 3, 1998

[54] BLOWER VACUUM

[75] Inventors: Lee Sowell; Kenneth M. Brazell, both of Phoenix, Ariz.

[73] Assignee: Ryobi North America, Easley, S.C.

[21] Appl. No.: 690,334

[22] Filed: Jul. 26, 1996

[51] Int. Cl.$^6$ ..................................................... A47L 5/24
[52] U.S. Cl. .......................... 15/330; 15/344; 15/346; 15/405
[58] Field of Search ..................... 15/330, 345, 346, 15/344, 405

[56] References Cited

U.S. PATENT DOCUMENTS

| | | |
|---|---|---|
| 4,187,577 | 2/1980 | Hansen . |
| 4,227,280 | 10/1980 | Comer . |
| 4,242,794 | 1/1981 | Peterson ............................. 15/405 X |
| 4,404,706 | 9/1983 | Loyd ..................................... 15/405 X |
| 4,413,371 | 11/1983 | Tuggle et al. ........................ 15/405 |
| 4,644,606 | 2/1987 | Luerken et al. . |
| 5,450,649 | 9/1995 | Turnbull ............................... 15/330 |
| 5,522,115 | 6/1996 | Webster ............................... 15/405 X |
| 5,604,954 | 2/1997 | Webster et al. ..................... 15/330 |
| 5,659,920 | 8/1997 | Webster et al. ..................... 15/330 X |

*Primary Examiner*—Chris K. Moore
*Attorney, Agent, or Firm*—Brooks & Kushman P.C.

[57] ABSTRACT

A blower vacuum attachment for use with a multi-purpose power tool having a motor for powering the attachment on the elongated tubular boom extending between the attachment and the motor through which a drive shaft extends. The attachment includes a tubular connector for attaching a blower housing to the tubular boom. The blower housing has an axial air inlet and a circumferential air outlet. An impeller oriented within the housing and driven by the drive shaft draws air into the axial air inlet and discharges air to the air outlet. An intake tube is affixed to the blower housing inlet and extends axially therefrom. A debris collection bag and a blower tube can be alternately attached to the blower housing air outlet so that the blower vacuum attachment could be used respectively as a vacuum or as a blower. The blower tube has an air inlet which is removably attached to blow the air out and an air outlet which is oriented generally adjacent the intake tube inlet for discharging air along a blower outlet axis which is spaced from and generally parallel to the central axis aligned with the intake tube. The blower tube air outlet is sized relative to the intake tube air inlet so that the air discharge velocity is substantially higher than the air intake velocity enabling the attachment to be used in the blower mode without removal of the intake tube from the blower housing or changing the way the user grasps the multi-purpose power tool.

8 Claims, 3 Drawing Sheets

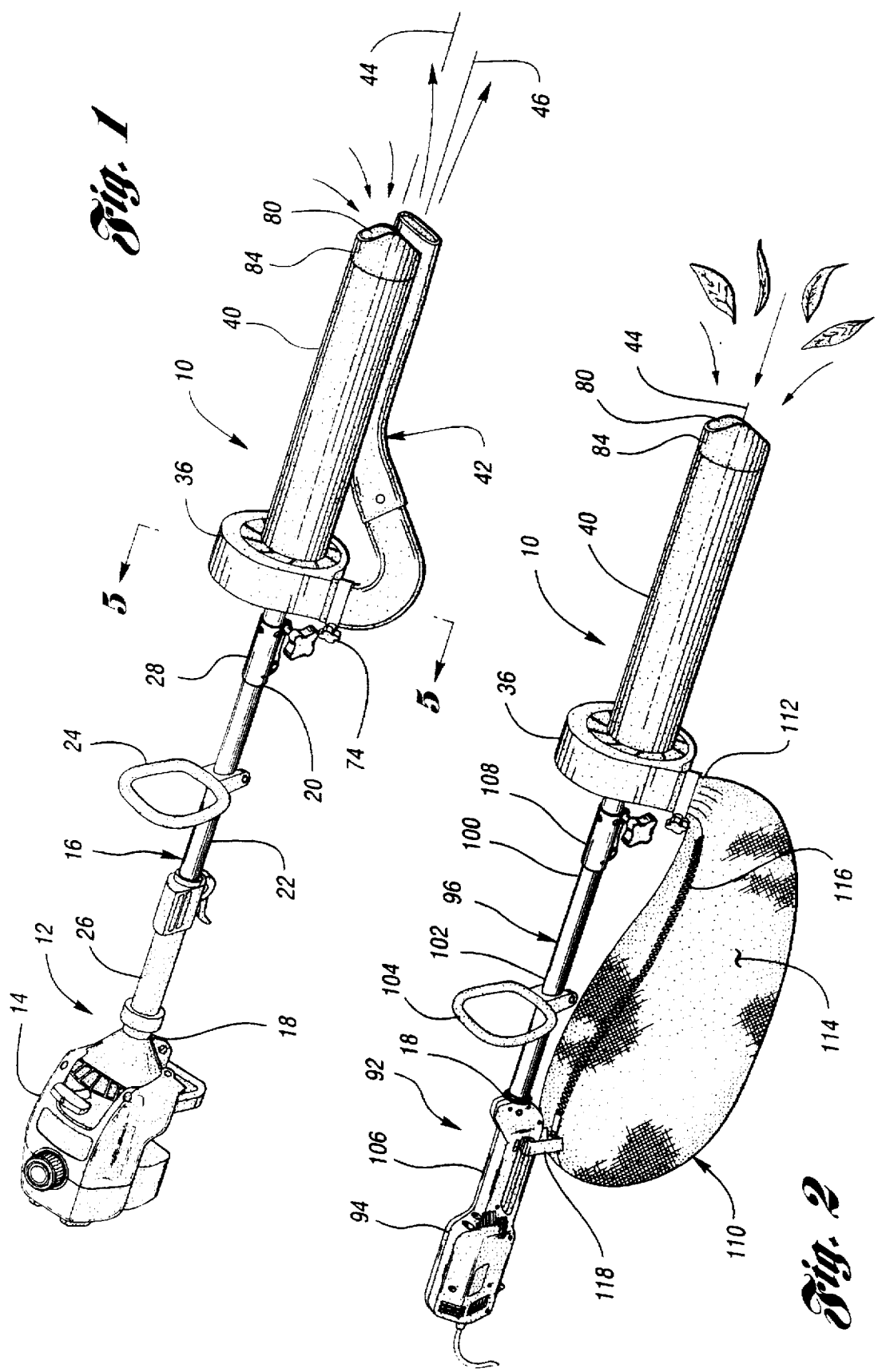

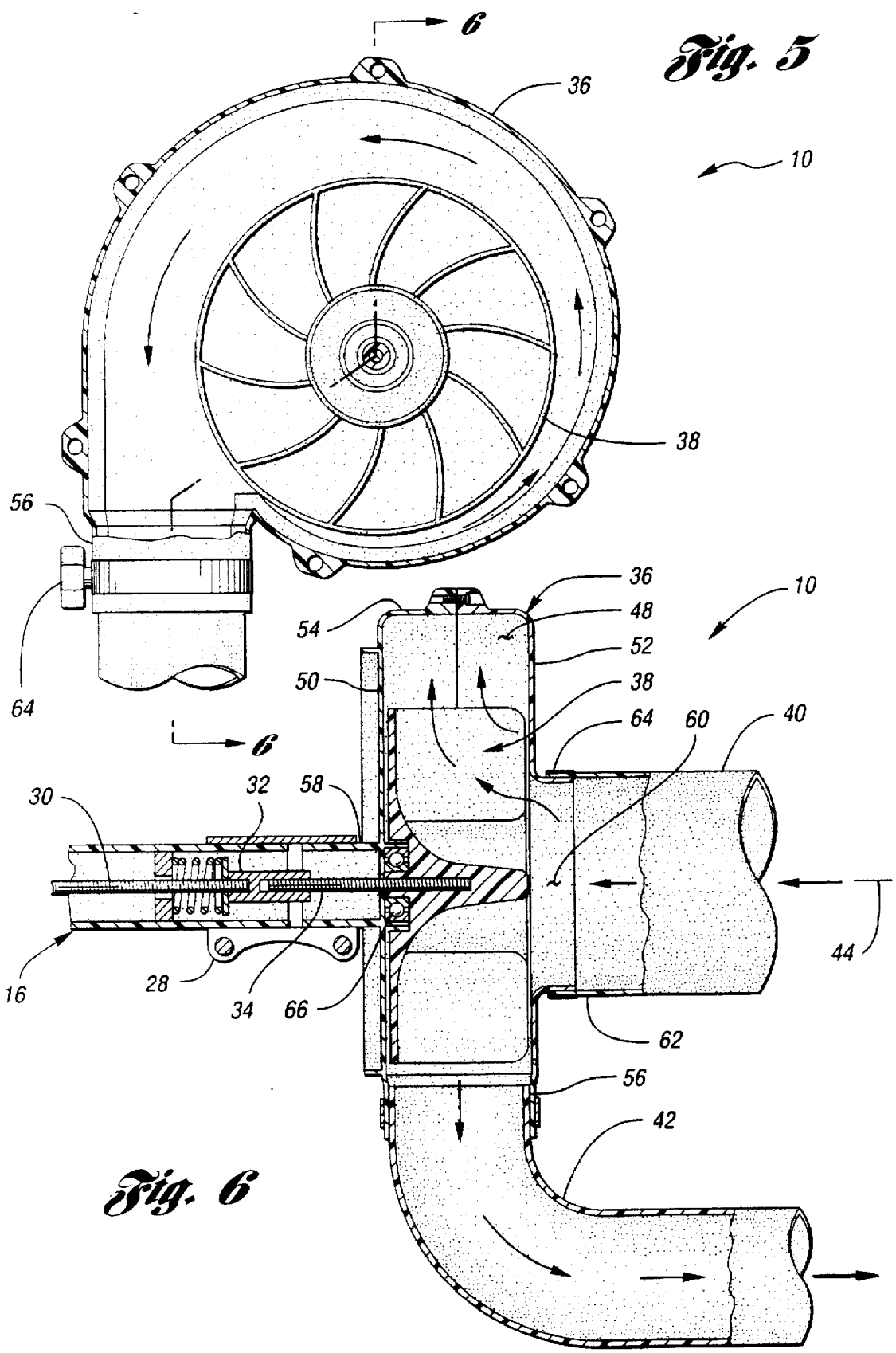

BLOWER VACUUM

TECHNICAL FIELD

The present invention relates to operator carried blower vacuums and in more particularly, to a convertible blower vacuum attachment used in conjunction with a multi-purpose power tool having an elongated boom with an attachment at one end and a motor at the other.

BACKGROUND ART

Portable air blowers are commonly used in outdoor yards and gardens to sweep up leaves and other debris. Portable air blowers are currently available in a number of mechanical configurations ranging from backpack mounted engine/blower assemblies having an air discharge wand as used by commercial lawn services to a simple add-on blower attachment connectable to a line trimmer head. The two most common types of portable air blowers are the unitary motor/blower type as shown in U.S. Pat. No. 4,644,606 and the elongated boom type, as shown in U.S. Pat. No. 4,404,706. Elongated boom type blowers have a blower unit mounted on one end of a boom with a motor on the opposite end of the boom with a drive shaft extending through the boom operatively connecting the motor to the blower impeller.

Boom type blowers are traditionally provided with an injection molded plastic blower housing having an integrally formed axial air inlet and a generally circumferential air outlet perpendicular to the impeller rotation. The discharged air pattern is dictated by the geometry of the air outlet formed in the blower housing. The unitary motor/blower units are provided with removable blower outlet tubes and in some instances, removable nozzle sections mounted on the elongated end of the blower tube in order to vary the air discharge pattern.

SUMMARY OF THE INVENTION

Accordingly, a blower vacuum of the present invention is provided for use with an operator carried power tool having a motor with an elongated boom extending therefrom, the boom having an internal rotatable shaft passing therethrough between the motor and the blower vacuum. The blower vacuum is made up of a blower housing having an axial air inlet and circumferential air outlet, and an impeller oriented within the blower housing which is driven by the power tool motor. An intake tube is affixed to the blower housing air inlet and extends axially away from the blower housing.

A debris collection bag and a blower tube can be alternatively connected to the blower housing air outlet to convert the blower vacuum between the vacuum mode and the blower mode. When the debris collection bag is installed, debris ingested through the intake tube is trapped within an internal cavity in the collection bag as the discharged air escapes through the bag's porous wall.

When the blower tube is attached to the housing air outlet, the intake tube remains in place. The blower tube extends generally parallel to and adjacent the inlet tube and has an air outlet for discharging air along and aligned with the intake tube. The blower tube discharge outlet is sized relative to the intake tube so that the air discharge velocity is substantially higher than the air intake velocity.

It is therefore an object of the present invention to provide a portable blower vacuum driven by a multi-purpose power tool which can be used in both the blower and vacuum modes without changing the user's handle orientation.

It is a further object of the present invention to provide an operator-carried blower vacuum which is ergonomically acceptable and convenient to use by a wide cross-section of the consuming public.

It is a still further object of the present invention to provide a convenient low cost way for a user of a portable multi-purpose power tool to convert a blower vacuum attachment for operating between the blower and vacuum modes.

Other objects, features, aspects and embodiments of the present invention will be readily apparent from the following detailed description of the preferred embodiment.

BRIEF DESCRIPTION OF THE DRAWINGS

FIG. 1 is a perspective view of the blower vacuum attachment according to the present invention in the blower mode;

FIG. 2 is a perspective view of the blower vacuum attachment according to the present invention in the vacuum mode;

FIG. 5 is a cutaway cross-sectional view taken along line 5—5 of FIG. 1; and

FIG. 6 is a cutaway cross-sectional side elevational view taken along line 6—6 of FIG. 5.

BEST MODE FOR CARRYING OUT THE INVENTION

Figure 3:
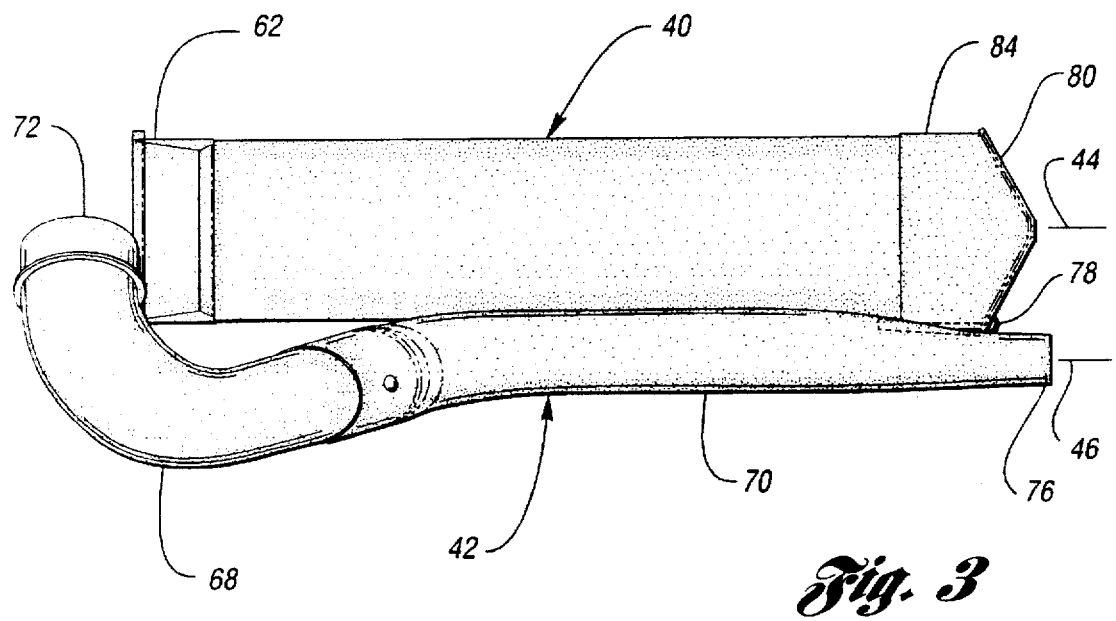
FIG. 3 is a right side elevational view of the intake tube and blower tube.

Referring to FIGS. 1–6, a blower vacuum attachment of the present invention is generally indicated by the reference numeral 10. The blower vacuum attachment 10 in FIG. 1 is attached to a multi-purpose power tool 12 having a motor 14 in the form of a gasoline internal combustion engine. Multi-purpose power tool 12 is provided with an elongated tubular boom 16 having a first end 18 affixed to a motor 14, a second end 20, and an intermediate section 22 extending between first end 18 and second end 20. Preferably at least one handle is provided on tubular boom 16. In the embodiment of the multi-purpose tool illustrated, front handle 24 and rear handle 26 are provided in conventional spaced apart orientation.

Multi-purpose power tool 12 is further provided with a coupling 28 affixed to the tubular boom 16 at second end 20 to enable a user to releasably attach a variety of implements such as the blower vacuum attachment 10 of the present invention or line trimmers, edges cultivators, hedge trimmers, snow throwers or the like. As shown in FIG. 6, within the tubular boom 16 of the multi-purpose power tool is a drive shaft 30. Drive shaft 30 terminates in a connector 32 which telescopically engages a rotatably driven impeller input shaft 34.

Blower vacuum attachment 10 is shown in FIG. 1 in the blower mode. Blower vacuum attachment 10 is made up of a blower housing 36, an impeller 38 (shown in FIGS. 5 and 6), an air intake tube 40 and a blower tube 42. The blower tube 42 is aligned along a central axis 44 which extends coaxially through the blower tube 42, through the impeller 38 and preferably is aligned with tubular boom 16 of the multi-purpose power tool 12.

When the blower vacuum attachment 10 is used in the blower mode, both the blower tube 42 and intake tube 40 are affixed to the blower housing 36 as illustrated in FIG. 1. Air discharged from the blower tube 42 is directed along an outlet axis 46 spaced from and generally parallel to central axis 44.

Blower housing 36 is best illustrated in FIGS. 5 and 6. Blower housing 36 is aligned along central axis 44 and defines an internal cavity 48 bounded by first wall 50, second wall 52, which is spaced axially therefrom, and circumferential wall 54 extending (or spanning) between first and second walls 50 and 52, respectively. In the preferred embodiment, circumferential wall 54 forms a volute shaped housing as best seen in FIG. 5 having a radius relative to central axis 44 which varies circumferentially. An air outlet 56 is formed in circumferential wall 54 and is generally tangentially aligned with the outer periphery of impeller 38.

First wall 50 is affixed to a centrally aligned tubular connector 58 which serves to couple the blower attachment 10 to coupling 28 as illustrated in FIG. 6. Second wall 52 is provided with a central axially oriented air inlet 60 which provides an air inlet into the internal cavity. Air inlet 60 is affixed to output end 62 of intake tube 40 as illustrated in FIG. 6. Preferably, intake tube 40 is securely affixed to air inlet 60 of blower housing 36 utilizing a band clamp 64 or the like.

Impeller 38 as illustrated in FIG. 6 is pivotally mounted relative to the housing 36 on a conventional bearing, such as ball bearing 66 or alternatively on a simple bushing, not shown. An impeller input shaft 34 is affixed to impeller 38 and is rotatably driven by connector 32 on drive shaft 30.

Figure 4:
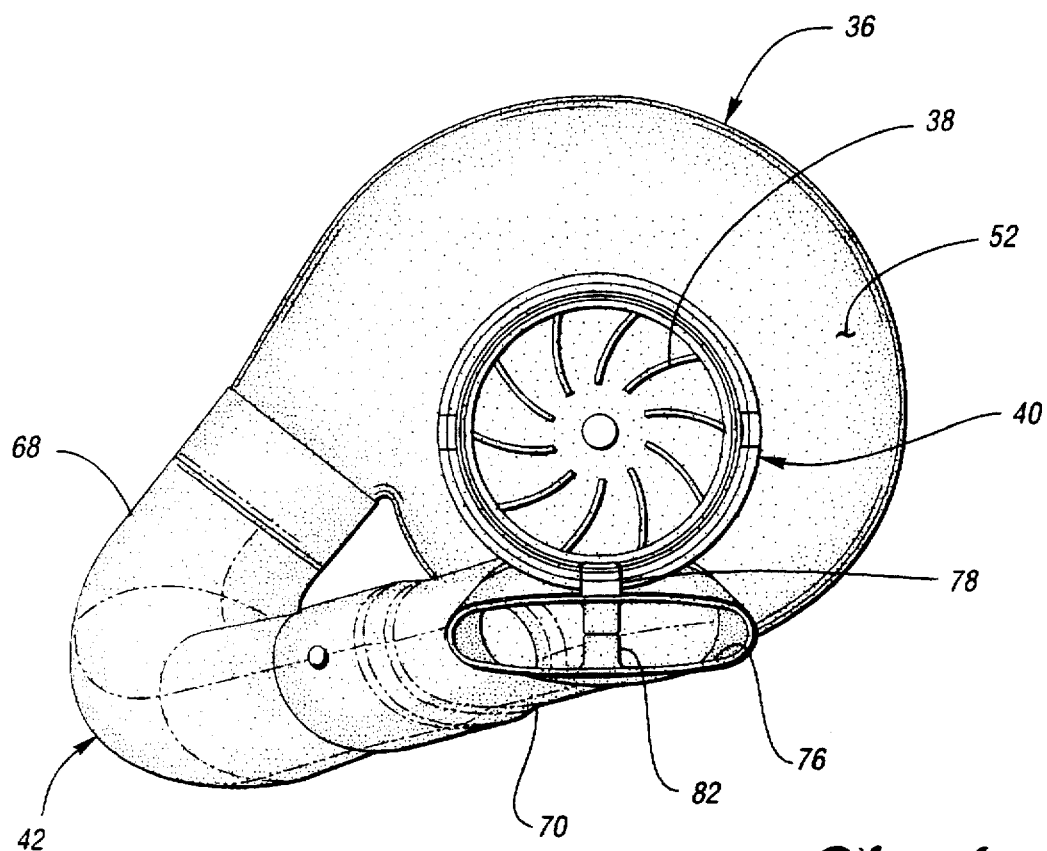
FIG. 4 is an axial end view of the blower vacuum attachment in the blower mode.

Blower tube 42 is illustrated in greater detail in FIGS. 3 and 4. In the preferred embodiment illustrated, for manufacturing cost reasons, blower tube 42 is made of two pieces, first section 68 and second section 70 which are attached telescopically. Blower tube 42 is provided with an air inlet 72 which is removably attachable to air outlet 56 of blower housing 36. In order to facilitate the removal and reinstallation of blower tube 42, releasable band clamp 64 extends about the air outlet 56 of blower housing 36. Preferably, blower tube 42, particularly air inlet 72 thereof, telescopes inside of blower housing air outlet 56 for a distance sufficient to cause band clamp 64 to circumscribe the overlap region. Preferably, the air outlet 56 region is provided with a series of circumferentially spaced about axially aligned slits (not shown) to render the air outlet 56 flexible enough to be deflected by the band clamp 64 into sealing engagement with air inlet 72 of blower tube 42.

Blower tube 42 is provided with an air outlet 76 aligned along outlet axis 46, spaced from and aligned parallel to central axis 44 as shown in FIG. 3. In order to support blower tube 42 in the preferred embodiment, fastener clip 78 is affixed to a wall of the blower tube 42 as shown in FIGS. 3 and 4 so that the fastener clip 78 can be hooked across the peripheral edge 80 of the air inlet 60 of intake tube 40. Fastener clip 78 is preferably formed of spring steel and is affixed to blower tube 42 using conventional rivets, not shown.

In order to provide structure to the blower tube 42 in the region of air outlet 76, a vertical column 82 is formed in the blower tube 42 as illustrated in FIG. 4. The vertical column 82 not only provides structure, but causes the discharge air stream to be fanned out transversely to the discharge outlet axis 46. Preferably, the cross-sectional area of outlet 76 is substantially smaller than the cross-sectional area of air inlet 60 so that the intake air will not substantially effect the efficiency of the blower vacuum when operated in the blower mode. In the preferred embodiment, air inlet 60 has a cross-sectional area two to five times the area of air outlet 76 and most preferably 2.5 times the area of the air outlet 76.

In the preferred embodiment, blower tube 42 is blow molded from high density polyethylene (HDPE). Intake tube 40 is extruded from ABS. As shown in FIGS. 1–3, intake tube 40 is preferably provided with a reinforcing collar 84 extending circumferentially about the intake tube 40 adjacent air inlet 60 in order to provide structural rigidity to the air inlet and to increase wear life.

Blower tube 42 is preferably formed with nice smooth bends to minimize pressure drop of the air falling therethrough. Blower tube 42 is provided with generally a straight section adjacent the air outlet 76 and a compound S-curved section extending between the straight section and air inlet 72. Ideally, the effective cross-sectional area of the blower tube 42 is relatively uniform throughout its length. It should be appreciated that the curved sections of the tube of a cross-sectional area which is physically larger than the straight sections in order to maintain the effective cross-sectional area and maximize air flow through the tube for a given differential pressure. In the preferred embodiment illustrated, the cross-sectional area is 6.5 inches. The intake tube 40, on the other hand, is preferably straight and a constant circular cross-section throughout its entire length. In the preferred embodiment illustrated, the intake tube 40 cross-sectional area is 15.9 square inches. Although a round cross-section is preferred for both the intake tube 40 and the blower tube 42, an oval cross-section could be used without adversely effecting air flow, or debris accumulation in intake tube 40.

FIG. 2 illustrates the blower vacuum attachment 10 utilized in the vacuum mode. For illustration purposes, FIG. 2 depicts a multi-purpose power tool 92 having a motor 94 in the form of a corded AC electric motor. Similar to multi-purpose power tool 12 described with reference to the first embodiment, multi-purpose power tool 92 is provided with a tubular boom 96 having a first end 98 and a second end 100. Tubular boom intermediate section 102 supports a pair of handles, front handle 104 and rear handle 106. Coupling 108 facilitates the attachment of the blower vacuum attachment 10 to multi-purpose power tool 92 in the manner described previously with respect to multi-purpose power tool 12.

When operated in the vacuum mode, blower tube 42 is removed and temporarily stored and a debris collection bag 110 is installed. Debris collection bag 110 is provided with air inlet 112. Air inlet 112 is fastened to blower housing air outlet 56 utilizing band clamp 64. The debris collection bag 110 is formed of a porous material 114 formed of a loosely woven fabric which defines an internal cavity for trapping debris collected when the attachment 10 is used as a vacuum. In order to facilitate the removal of debris when the bag 110 is filled, the collection bag 110 is preferably provided with a zippered opening 116. In order to prevent the debris collection bag 110 from dragging on the ground as it becomes ladened with collected debris, a strap 118 is provided for attachment of the debris collection bag 110 to the multi-purpose power tool 92.

In both the vacuum and the blower modes, the operator can conveniently grasp the multi-purpose power tool 12 and 92 having the blower vacuum attachment 10 affixed thereto without changing the user's grip on the front or rear handles of the power tool. The power tool is very convenient to utilize and has very good balance and weight distribution.

While the best mode for carrying out the invention has been described in detail, those familiar with the art to which this invention relates will recognize various alternative designs and embodiments for practicing the invention as defined by the following claims.

What is claimed is:

1. An blower vacuum attachment for a multi-purpose power tool having a motor, an elongated tubular boom having a first end affixed to the motor, a spaced apart second end, and an intermediate section therebetween having a handle thereon, a drive shaft extending through the tubular boom having a driven end driven by the motor and an output end for powering one of a plurality of attachments, and a coupling mounted to the tubular boom second end for releasably affixing a selected one of a plurality of attachments to the multi-purpose power tool, the blower vacuum attachment comprising:

a tubular connector affixable to the coupling of the multi-purpose power tool;

a blower housing having a central axis and an internal cavity bounded by a first wall, a second wall, and a circumferential wall, the first wall affixed to the tubular connector, the second wall axially spaced from the first wall and having an axially oriented air inlet extending therethrough for allowing air to enter the internal cavity, the circumferential wall spanning between the first and second walls, extending circumferentially about the central axis and having an air outlet formed therein to enable air to exit from the internal cavity;

an impeller oriented within the internal cavity of the blower housing and pivotally mounted thereto for rotation about the central axis causing air to enter the internal cavity through the air inlet and be discharged through the air outlet;

an impeller shaft affixed to the impeller and extending through the blower first wall and the tubular connector for removable engagement with the output end of the drive shaft of the multi-purpose power tool;

an intake tube affixed to the blower housing air inlet and extending generally axially away from the blower housing;

a debris collection bag having an air inlet which is removably attachable to the air outlet of the blower housing and a porous wall member defining an internal cavity for trapping debris collected when the attachment is used as a vacuum; and a blower tube for discharging a high velocity stream of air when the attachment is used as a blower, the blower tube having an air inlet which is removably attachable to the blower housing air outlet and an outlet oriented generally adjacent the intake tube inlet for discharging air along a blower outlet axis which is spaced from and generally parallel to the central axis, the air outlet having an area sized relative to the air inlet so that the air discharge velocity is substantially higher than the air intake velocity.

2. The blower vacuum attachment of claim 1 further comprising a fastener for releasably attaching the blower tube to the intake tube when the blower vacuum attachment is used as a blower.

3. The blower vacuum attachment of claim 1 wherein said blower housing air outlet is oriented along an axis spaced from and substantially perpendicular to the central axis generally tangential to the periphery of the impeller, and the blower tube is provided with a generally straight section adjacent the blower tube, an outlet spaced from and parallel to the central axis, and a compound "S" curve section extending between the straight section and the air inlet.

4. The blower vacuum attachment of claim 1 wherein the cross-sectional area of the intake tube air inlet is two to five times greater than the cross-sectional area of the blower tube air outlet.

5. A blower vacuum comprising:

a motor;

an elongated tubular boom having a first end affixed to the motor, a spaced apart second end, and a intermediate section therebetween having at least one handle;

a drive shaft extending through the tubular boom having a driven end rotatably driven by the motor and an output end;

a blower housing affixed to the tubular boom second end having a central axis and an internal cavity bounded by a first wall, a second wall and a circumferential wall, the first wall being affixed to the tubular boom second end, the second wall having a central axial air inlet allowing air to enter the blower housing internal cavity, and the circumferential wall having an air outlet to enable air to exit from the internal cavity;

an impeller oriented within the internal cavity of the blower housing and connected to the drive shaft output end for rotation about the central axis, the rotation of the impeller relative to the blower housing causing air to enter the internal cavity of the blower through the air inlet and discharged through the air outlet;

an intake tube affixed to the blower housing air inlet and extending generally axially away from the blower housing;

a debris collection bag having an air inlet which is removably attachable to the air outlet of the blower housing and a porous wall member defining an internal cavity for trapping debris collected when the attachment is used as a vacuum; and a blower tube for discharging a high velocity stream of air when the blower vacuum attachment is used as a blower, the blower tube having an air inlet which is removably attachable to the blower housing air outlet and an outlet oriented generally adjacent the intake tube inlet for discharging air along a blower outlet axis which is spaced from and generally parallel to the central axis, the air outlet having an area sized relative to the air inlet so that the air discharge velocity is substantially higher than the air intake velocity.

6. The blower vacuum attachment of claim 5 further comprising a fastener for releasably attaching the blower tube to the intake tube when the attachment is used as a blower.

7. The blower vacuum attachment of claim 5 wherein said blower housing air outlet is oriented along an axis spaced from and substantially perpendicular to the central axis generally tangential to the periphery of the impeller, and the blower tube is provided with a generally straight section adjacent the blower tube, an outlet spaced from and parallel to the central axis, and a compound "S" curve section extending between the straight section and the air inlet.

8. The blower vacuum attachment of claim 5 wherein the cross-sectional area of the intake tube is two to five times greater than the cross-sectional area of the blower tube outlet.

* * * * *